United States Patent [19]

Torre et al.

[11] Patent Number: 4,767,811

[45] Date of Patent: Aug. 30, 1988

[54] THERMOPLASTIC POLYAMIDE MOULDING MATERIAL HAVING REDUCED WATER UPTAKE CONTAINING EPOXY COMPOUND

[75] Inventors: Hans D. Torre, Domat/Ems; Manfred Hoppe, Chur, both of Switzerland

[73] Assignee: Ems-Inventa A.G., Switzerland

[21] Appl. No.: 82,936

[22] Filed: Aug. 5, 1987

Related U.S. Application Data

[63] Continuation of Ser. No. 863,619, May 15, 1986, abandoned.

[30] Foreign Application Priority Data

May 15, 1985 [CH] Switzerland ............. 02080/85

[51] Int. Cl.$^4$ .................................... C08G 69/46
[52] U.S. Cl. ................................ 524/114; 524/101; 525/430
[58] Field of Search ................ 524/114, 101; 525/430

[56] References Cited

U.S. PATENT DOCUMENTS

| | | | |
|---|---|---|---|
| 3,498,953 | 3/1970 | Glfers ............................. | 525/430 |
| 3,699,183 | 10/1972 | Hermann et al. .................. | 525/430 |
| 4,071,486 | 1/1978 | Parker ............................ | 524/114 |
| 4,383,065 | 5/1983 | Woo et al. ....................... | 524/114 |

*Primary Examiner*—Harold D. Anderson
*Attorney, Agent, or Firm*—Jordan B. Bierman

[57] ABSTRACT

Thermoplastic polyamide molding materials having reduced water uptake are obtained by the addition of 0.3–15% by weight, based on the polyamide, of an epoxide compound containing at least one oxirane group of general formula I

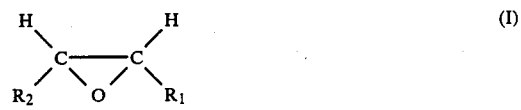

in which $R_1$ is hydrogen, alkyl, aralkyl or aryl, and $R_2$ is hydrogen, alkyl, dialkyl, aryl, or a group of general formula II

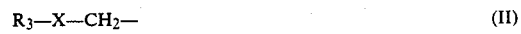

in which X can be oxygen, sulfur or substituted nitrogen and $R_3$ can be a substituted or non-substituted aromatic, cycloaliphatic, araliphatic or aliphatic group which can also contain further oxirane groups and be interrupted by other groupings.

Glycidyl ethers are particularly preferred epoxide compounds. The molding materials of the invention are suitable especially for use in the construction of motor vehicles, instruments, apparatus or machines.

11 Claims, No Drawings

THERMOPLASTIC POLYAMIDE MOULDING MATERIAL HAVING REDUCED WATER UPTAKE CONTAINING EPOXY COMPOUND

This application is a continuation of application Ser. No. 863,619, filed May 15, 1986, now abandoned.

This Application claims the priority of Swiss No. 2080/85, filed May 15, 1985.

The invention relates to thermoplastic polyamide molding materials which, owing to the addition of an epoxide compound containing at least one oxirane group, have reduced water uptake.

The properties of polyamides depend inter alia on the polarity of the carboxylic acid amide groups as well as on the nature of the hydrogen bridge bonding between these groups. However, the polarity is the basic reason that polyamides have the property of taking up water. The water uptake is in direct relationship to the number of carboxylic acid amide groups in the polymer molecule. It occurs, not only on storing polyamide samples in water, but also when they are exposed to moist air; i.e. ambient conditions (conditioning).

The important practical properties of polyamides (hereinafter designated as PA), in particular those of short chains such as PA 6 and PA 6.6, depend very heavily on the water uptake; e.g. impact toughness, elongation at break and flexibility. Thus, if PA 6 injection molded parts are subjected to conditioning, their notch impact toughness, for example, increases but, at the same time, their stiffness and dimensional stability are reduced in comparison with freshly-extruded parts. Accordingly, certain PA properties can be improved as the result of water uptake, while others are unfavorably influenced.

The maintenance or improvement of the stiffness and dimensional stability of polyamide molded parts is necessary if the parts are to have bearing and/or strength reinforcing properties. Such characteristics are required, for example, in the construction of motor vehicles, instruments, apparatus, or machines.

Processes are known for the improvement of certain properties of polyamides; e.g. increasing the stiffness and dimensional stability by using suitable additives. These can be achieved by working reinforcing materials such as fibers or minerals into the material. Generally, however, the weight of the molded parts, as well as their brittleness, is increased as a result.

In order to improve toughness in the freshly-extruded, dry state, foreign polymers such as polyolefins, e.g. polyethylene, polypropylene or copolymers thereof, as well as such polymers with polar side chains such as polyvinyl acetate, and also elastomers based on rubbers such as butadiene-acrylonitrile or modified, e.g. terminated polymers, can be included. By such measures, impact-related properties are indeed improved, but the water uptake effect of the carboxylic acid amide groups, and its stiffness-reducing influence, remains.

By lengthening the number of members between the carboxylic acid amide groups of the polyamide molecule, better toughness values are similarly obtained, e.g. by the polycondensation of long-chain diamines with similar dicarboxylic acids or of multi-chain lactams. Reduced heat stability and lower stiffness must then be taken into account so that, once again, the usefulness of such PA types is limited.

DOS No. 3,248,329 suggests that reduction in water uptake and increase of dimensional stability of polyamides can be achieved by incorporating in particular long-chained phenols which are at most substituted in one o-position. Dodecylphenol, 2-hydroxybiphenyl, nonylphenol and 2-phenyl-2-(4-hydroxyphenyl)propane are particularly preferred. The effectiveness of such additives in reducing water uptake is said to be associated with certain disadvantages, putting the effectiveness of the measure into question. Firstly, there may be smoke and odor problems during extrusion. Further, the phenol-modified PA parts have an orange-to-reddish coloration which is undesirable for many uses. Moreover, phenolic additives in polyamides are not resistant to being washed out; i.e. they can be relatively easily removed with certain solvents such as water and methanol, particularly at elevated temperatures, and from thin molded parts. As a result, the effect of reduced water uptake is lost.

The utility of polyamides could be increased if molded parts were not only tough but also stiff, dimensionally-stable and heat-stable. It has now been found that, by working certain epoxide compounds into the polyamide, a strong hydrophobic effect is achieved, without causing the disadvantages described above.

Insofar as it is already known to introduce epoxides into polyamides, such additives have, in general, been limited to polyfunctional epoxide compounds to promote a cross-linking reaction with the polyamide. The aim for such products is increasing the strength of polyamides, or the formulation of adhesive systems with good temperature stability.

According to the present invention, from 0.3 to 15 parts, preferably 0.5 to 12 parts, by weight of an epoxide compound are added to 100 parts by weight of a thermoplastic polyamide, to cause a reduction in water uptake. It appears that the possibility of providing hydrophobicity (reduction of water uptake) to polyamides by introducing epoxide compounds has not previously been known, used, or suggested.

The epoxide compounds useful for this purpose are those with at least one oxirane group, as shown in formula I.

(I)

in which $R_1$ is selected from hydrogen, alkyl, aralkyl or aryl and $R_2$ is selected from hydrogen, alkyl, aralkyl, aryl and, preferably, a group of formula II

(II)

in which X is oxygen, sulfur, or $NR_4$; and $R_3$ and $R_4$ are independently selected from hydrogen and substituted or unsubstituted aromatic, cycloaliphatic, araliphatic or aliphatic groups which can also contain further oxirane groups and be interrupted by other groupings. $R_3$ and $R_4$ are not both hydrogen at the same time.

Glycidyl ethers are especially preferred as the epoxide compounds. The oxirane grouping or the glycidyl ether grouping may appear repeatedly in the epoxide compounds according to the invention.

The following mono-, di- or polyglycidyl ethers may be listed as examples of the given epoxide compounds: n-butyl glycidyl ether, 2-ethylhexyl glycidyl ether, glycidyl ethers of long-chain aliphatic alcohols, ethylene glycol diglycidyl ether, butoxy-diethylene glycidyl ethers, neopentylglycol diglycidyl ether, butanediol diglycidyl ethers, hexanediol diglycidyl ethers, phenyl glycidyl ether, cresyl glycidyl ethers, p-tert-butylphenyl glycidyl ethers, phenylphenol glycidyl ethers, dihydroxydiphenylpropane diglycidyl ethers, resorcinol and pyrocatechol diglycidyl ethers, triglycidyl isocyanurate, and nonylphenyl glycidyl ethers. Mixtures thereof may also be used.

Suitable polyamides are all crystalline, partially-crystalline, or amorphous polyamides having at least 4 ring members, as well as polyamides which can be prepared from lactams or from diamines and dicarboxylic acids; such as PA 4 to PA 12, and also PA 4.6, 6.6, 6.7, 6.8., 6.9, 6.10, 6.12, 8.8, 12.12, or those polyamides which are polycondensed from aliphatic, cycloaliphatic, araliphatic or aromatic dicarboxylic acids and diamines; such as from isophthalic acid, terephthalic acid, t-butylisophthalic acid, decanedioic acid, hexamethylenediamine, isophoronediamine, TCD, MNB or dicycanes.

Polyamide alloys and mixtures which contain a predominant proportion of polyamide and a residual part which comprises other polymeric compounds and/or fillers, reinforcing agents, pigments and/or additives of any type are also suitable. Further, polyamides according to the invention can contain additives such as stabilizers, crystallization accelerators, and mold separation agents.

Polyamides according to the invention can be prepared by mixing the untreated polyamide with the modifying agent above the melt temperature of the polyamide, and then extruded in a screw expeller or compounding machine in the conventional manner.

Conditioned polyamide molding materials according to the invention, in comparison with molding materials which have not been so modified, exhibit in an otherwise similar profile of properties lower water uptake and thus higher stiffness and greater dimensional stabililty. As a result, whether reinforced or unreinforced, they have particular suitabililty for, e.g. vehicle body construction. A further field of use in extrusion processes is as sheaths for cables, e.g. fiber optic cables.

The following Examples 1 to 4, 8 and 9 illustrate the invention, while Examples 5, 6, 7, 10, 11 and 12 are comparative. All relative viscosity values ($\eta$ rel) were determined as a 0.5% by weight solution in m-cresol at 25° C.

EXAMPLES 1 to 7

Polyamide 6 granulate ($\eta$ rel=2.8) was intimately mixed with the additives indicated in Table 1 in a mixing drum, and extruded in a two-wave extruder. The additive was an alkyl glycidyl ether in Examples 1 to 4 and a phenol of the type described in DOS No. 3,248,329 in Examples 6 and 7. No additive was used in Example 5.

The homogeneous melt-fluid extrudate was drawn off as a filament through a water bath, and comminuted in a granulator. The granulate was then dried to a residual water content of no more than 0.05% by weight. In Example 1, viscosity of the polyamide had not undergone any apparent change as a result of this procedure.

The polyamide was injection-molded to give test samples which were stored in water at 50° C. for several weeks and thereafter tested for their water uptake by weighing. The reduced water uptake of the polyamide samples according to the invention, in comparison with non-modified polyamide samples, was tested by Karl Fisher analysis, and the Chemische Werke Huels colorimetric analysis; see Kunststoffe, 9 (1970) 668–674. For better characterization of stiffness, the bending E modulus of the conditioned product was determined according to DIN 53,452, in certain of the Examples.

EXAMPLES 8 to 12

Amorphous copolyamides derived from laurolactam, isophthalic acid and Laromin (hereinafter designated CoPA; ($\eta$ rel=1.5) were modified in the manner of the previous Examples, as set forth in Table 2. Laromin is bis (4-amino-methyl-cyclohexyl)-methane, and has the structural formula

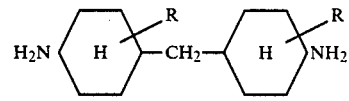

Example 10 used the amorphous CoPA without additive, while in Examples 11 and 12 phenols as in DOS No. 3,248,329 were included. The reduction in water uptake is less in the case of the amorphous copolyamides, but is still clearly apparent in the samples of Examples 8 and 9, which are according to the invention.

The samples produced according to Examples 6, 7, 11 and 12 were orange/reddish-colored, and were not resistant to washing out on contact with warm water (at 50° C.); in one extraction run, the phenols could be detected together with the extracted oligomers in the infra-red spectrum and by gas chromatography. The samples of Examples 1 to 5, 8, 9 and 10 were whitish/pale, and the additive could hardly be removed by washing.

TABLE 1

| Example | PA 6 (% by wt.) | Additive | Additive (% by wt.) | Water Uptake | Bending E-Modulus Cond. N/mm$^2$ |
|---|---|---|---|---|---|
| 1 | 96 | C$_{13}$-C$_{15}$—alkyl glycidyl ether | 4 | 7.18 | 830 |
| 2 | 95 | p-t-butylphenyl glycidyl ether | 5 | 6.38 | 835 |
| 3 | 96 | phenyl glycidyl ether | 4 | 7.42 | — |
| 4 | 96 | o-cresyl glycidyl ether | 4 | 7.45 | — |
| 5 | 100 | — | — | 9.56 | 780 |
| 6 | 96 | o-p-nonylphenol | 4 | 7.78 | 612 |
| 7 | 94 | o-phenylphenol | 6 | 6.98 | 681 |

TABLE 2

| Example | CoPA (% by wt.) | Additive | Additive % by wt. | Water Uptake |
|---|---|---|---|---|
| 8 | 96 | o-cresyl glycidyl | 4 | 3.18 |

TABLE 2-continued

| Example | CoPA (% by wt.) | Additive | Additive % by wt. | Water Uptake |
|---|---|---|---|---|
| 9 | 95 | ether p-t-butylphenyl glycidyl ether | 5 | 3.14 |
| 10 | 100 | — | — | 3.88 |
| 11 | 95 | o-phenylphenol | 5 | 3.46 |
| 12 | 96 | t-butylphenol | 4 | 3.30 |

What we claim is:

1. A thermoplastic polyamide 6 molding material having reduced water uptake which comprises, per 100 parts by weight of polyamide, from 0.3 to 15 parts by weight of an epoxide compound containing at least one oxirane group of the formula

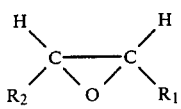 (I)

in which $R_1$ is hydrogen, alkyl, aralkyl or aryl, and $R_2$ is hydrogen, alkyl, aralkyl, aryl, or a group of the formula

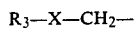 (II)

in which X is oxygen, and $R_3$ is independently hydrogen or alkyl substituted or unsubstituted aromatic, cycloaliphatic, araliphatic or aliphatic groups or such groups containing oxirane groups or such groups interrupted by other groupings.

2. The molding material of claim 1 which comprises from 0.5 to 12 parts by weight of said epoxide compound.

3. The molding material of claim 1 in which $R_2$ is a group of the formula II.

4. The molding material of claim 2 wherein $R_2$ is a group of the formula II.

5. The molding material of claim 3 in which the epoxide compound is a glycidyl ether.

6. The molding material of claim 4 wherein the epoxide compound is a glycidyl ether.

7. The molding material of claim 3 in which the epoxide compound is an aromatic monoglycidyl ether.

8. The molding material of claim 4 wherein said epoxide compound is an aromatic monoglycidyl ether.

9. The molding material of claim 7 in which said ether is substituted.

10. The molding material of claim 8 wherein said ether is substituted.

11. The molding material of claim 1 wherein said epoxide is taken from the class consisting of n-butyl glycidyl ether, 2-ethylhexyl glycidyl ether, glycidyl ethers of long-chain aliphatic alcohols, ethylene glycol diglycidyl ether, butoxy-diethylene glycidyl ethers, neopentylglycol diglycidyl ether, butanediol diglycidyl ethers, hexanediol diglycidyl ethers, phenyl glycidyl ether, cresyl glycidyl ethers, p-tert butylphenyl glycidyl ethers, phenylphenol glycidyl ethers, dihydroxydiphenylpropane diglycidyl ethers, resorcinol and pyrocatechol diglycidyl ethers, triglycidyl isocyanurate, and nonylphenyl glycidyl ethers, and mixtures thereof.

* * * * *